March 26, 1929.  W. S. PRITCHARD  1,706,540
WINDSHIELD
Filed Feb. 7, 1927

Inventor
William S. Pritchard

Attorneys

Patented Mar. 26, 1929.

1,706,540

UNITED STATES PATENT OFFICE.

WILLIAM S. PRITCHARD, OF DETROIT, MICHIGAN, ASSIGNOR TO MOTOR PRODUCTS CORPORATION, OF DETROIT, MICHIGAN, A CORPORATION OF NEW YORK.

WINDSHIELD.

Application filed February 7, 1927. Serial No. 166,572.

This invention relates to windshields and more particularly to improvements in the operating mechanism therefor.

The present invention relates to that type of windshield operating mechanism illustrated and described in my copending application, Serial No. 130,031 filed October 18, 1926, and has as one of its primary objects to simplify certain features of this prior construction whereby to render the same more efficient, simplify and cheapen the cost of manufacture and facilitate assembly.

Another object of this invention is to provide means for resisting end thrusts upon the worm shaft of the device and for automatically compensating for wear occasioned as the result thereof.

The invention also contemplates a construction and arrangement of parts wherein the number of parts is reduced to a minimum, consistent with efficiency and wherein the several parts of the apparatus may be quickly and accurately assembled without requiring the services of a skilled mechanic.

Figure 1:
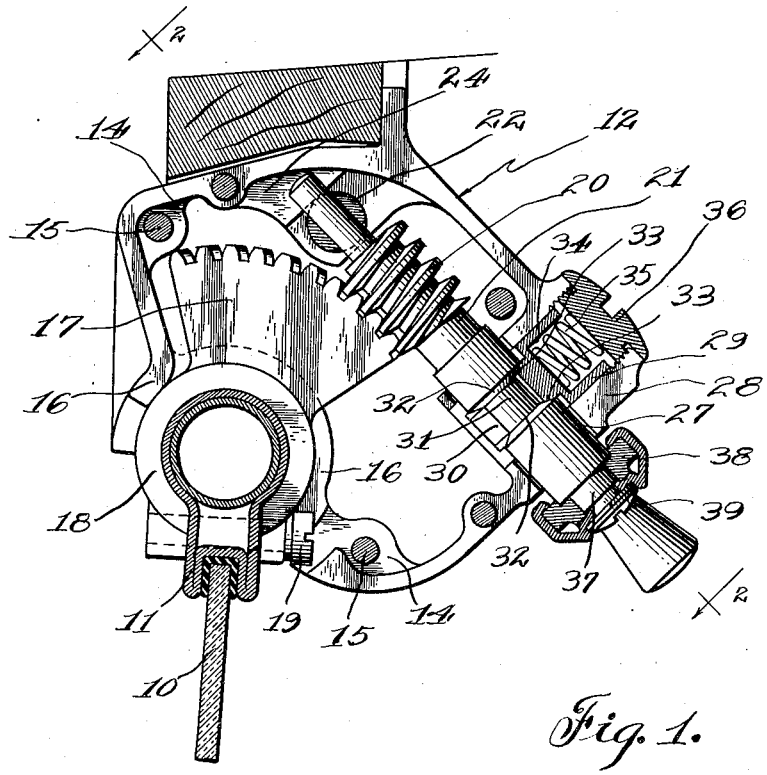
Figure 2:
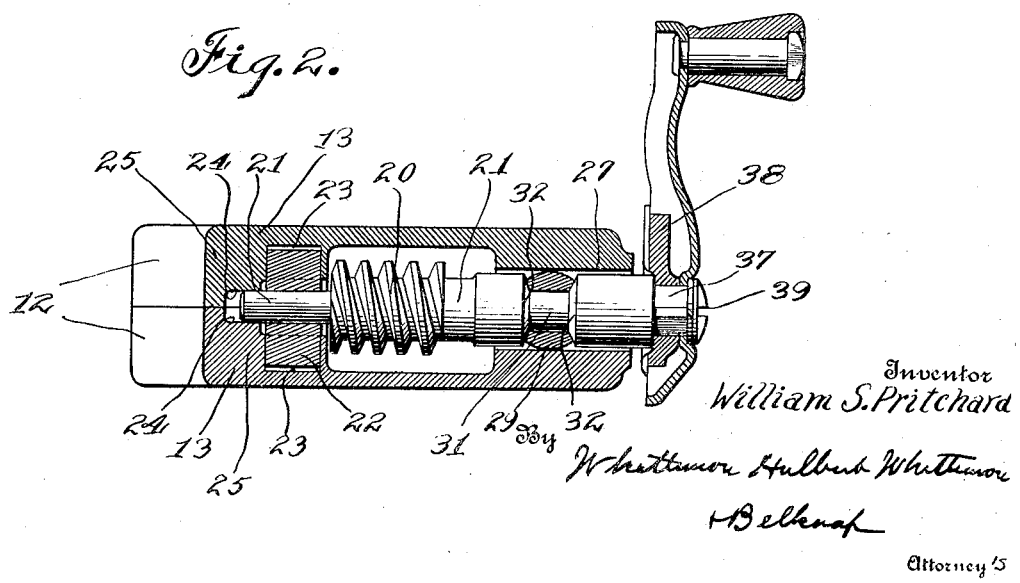

The above and other objects, advantages and novel details of construction of the present invention will be made more apparent as this description proceeds, especially when considered in connection with the accompanying drawings wherein:

Figure 1 is a vertical sectional view through the windshield operating mechanism constructed in accordance with my invention, and Figure 2 is a substantially horizontal sectional view taken on the plane indicated by line 2—2 in Figure 1.

Referring now more particularly to the drawings it will be noted that there is fragmentarily illustrated a windshield 10 provided with a top frame 11. The windshield is swingingly mounted preferably by means of horizontal pivots (not shown) at the ends of the top frame 11.

The windshield operating mechanism comprises a housing 12 formed of two complementary sections 13 engaging one another on a vertical line extending substantially centrally of the housing. Each housing section is preferably formed with apertured bosses or enlargements 14 with which bolts 15 engage for securing the two half sections of the housing together.

Rotatably supported by means of semicircular flanges 16 formed on the housing sections is a windshield operating gear member which comprises a worm gear sector 17 and a semi-circular hub member 18. The hub member 18 is in the form of a split or semi-circular sleeve which embraces or encircles the frame member 11 of the windshield and is rigidly secured thereto by means of a clamping bolt 19. Meshing with gear sector 17 is a worm 20 formed with a shaft 21. One end of worm shaft 21 is rotatably supported or journaled in a trunnion 22, the ends of which are journaled in recesses 23 formed in the housing sections 13 whereupon the trunnion 22 is rockable. The end of the worm shaft 21 extends through trunnion 22 and between the vertical faces 24 of solid portions 25 of the casing sections. These wall faces 24 limit the lateral displacement of the worm shaft but permit a vertical swinging movement of this end of the worm shaft.

The other end of the worm shaft 21 extends loosely through an enlarged aperture 27 formed in a solid portion 28 of the housing. This solid portion is bored to form a guide for slidably supporting an element 29 which acts to hold the worm 20 of worm shaft 21 resiliently in engagement with the worm gear sector and also acts to resist end thrusts imparted to the worm shaft and to compensate for wear occasioned as a result thereof. The lower end of element 29 is bifurcated or slotted as indicated at 30 whereup the two legs straddle a reduced portion 31 of the worm shaft. The worm shaft is provided with beveled or tapered surfaces 32 which are adapted to be engaged by beveled surfaces 33 on the element 29. This element is provided with a recess or well 34 within which a spring 35 is positioned which bears on the one hand against the bottom of the recess and on the other hand against a cap 36 threadedly engaging the housing. By reason of the spring 35 the element 29 normally urges the worm shaft in a direction wherein the worm 20 is held in engagement with the gear sector 17. At the same time the beveled surfaces 33 of the element 29 are in engagement with the tapered walls 32 to resiliently resist end thrusts and thus stabilize or fix the worm shaft longitudinally, it being understood that the trunnion end of the worm shaft loosely engages the trunnion so as to permit of a longitudinal movement of this worm shaft. It will furthermore be noted that there is a clearance left between the slotted portion of the element 29 and the reduced portion 31 of the worm shaft so as to compensate for wear occasioned to the parts by permitting the spring 35 to keep the beveled surfaces 32 and 33 in engagement.

The end of the worm shaft, which extends outside the casing, is preferably reduced and squared as indicated at 37, for engagement by the handle 38 which is secured in place by screws 39 threaded into the end of the worm shaft.

The rotation of worm shaft 21 by means of handle 38 will cause worm 20 to operate windshield 10 through the intermediary of gear sector 17. Inasmuch as the worm is carried by a shaft which is rockably mounted and is resiliently urged into engagement with the gear sector, shocks and jars occasioned to the windshield directly or transmitted thereto from the motor vehicle will be absorbed or dissipated and furthermore, wear upon the worm or gear sector will be automatically compensated for. By reducing the number of parts required in connection with the stucture just described, the cost of manufacture has not only been materially reduced but obviously the time, expense and skill incident to assembling the device has also been materially affected.

What I claim as my invention is:—

1. In a windshield mechanism, a rotatable worm shaft, means for mounting said worm shaft permitting longitudinal movement thereof and end thrust resisting means including a resiliently influenced member provided with a beveled surface engaging a correspondingly shaped surface on said worm shaft.

2. In a windshield construction, a worm shaft, means for mounting said shaft permitting rotation and limited longitudinal movement thereof, said worm shaft being provided with spaced oppositely inclined beveled surfaces, a slidably supported element provided with beveled surfaces engaging the beveled surfaces on said worm shaft and resilient means normally urging said element in engagement with said worm shaft.

3. In a windshield operating mechanism, a casing, a gear sector adapted to be connected to the windshield, a worm meshing with said gear sector, a worm shaft, means for rockably supporting said worm shaft adjacent one end thereof, said means permitting longitudinal movement of said shaft, a spring influenced element engaging said shaft for forcing said worm into engagement with said gear sector, the engaging surfaces of said shaft and element being shaped whereby said element resists end thrusts imparted to said shaft.

4. In a windshield operating mechanism, a housing, an operating shaft, an apertured trunnion member rockably mounted in said housing, the end of said operating shaft extending through the aperture in said trunnion, the walls of the housing adjacent said shaft end being spaced to form lateral guides therefor.

5. In a windshield operating mechanism, a housing, an operating shaft, a trunnion member rockably mounted in spaced opposed recesses formed in said housing and capable of limited longitudinal movement, said trunnion member being formed with an aperture through which the adjacent end of said operating shaft extends, the adjacent walls of the housing being spaced to form guides for the said end of said shaft to permit oscillation of the end of said shaft while preventing lateral movement thereof.

6. In a windshield mechanism, a swingingly mounted windshield, a gear secured thereto, a worm meshing with said gear, a shaft for said worm, a rockable trunnion supporting one end of said shaft, a spring influenced member engaging the other end of the shaft normally urging the same toward said gear and effectively resisting longitudinal end thrusts of the shaft.

7. In a windshield mechanism, a swingingly mounted windshield shaft, a gear secured thereto, a worm meshing with said gear, a shaft for said worm, means for rockably supporting one end of said shaft, and a spring influenced member having means surrounding said shaft and engageable therewith to normally urge the same toward said gear and to resist longitudinal end thrusts of the shaft.

8. In a windshield mechanism, a rotatable worm shaft having spaced beveled surfaces thereon, means for mounting said worm shaft permitting longitudinal movement thereof, and end thrust resisting means including a resiliently influenced member having an extension surrounding said shaft between the beveled surfaces thereof and having correspondingly shaped surfaces engageable with the beveled surfaces on said worm shaft.

9. In a windshield mechanism, a casing a gear sector adapted to be connected to the windshield, a worm meshing with said gear sector, a worm shaft, means permitting longitudinal movement of the worm shaft, and common means for urging said worm into engagement with said gear sector and for resisting the longitudinal end thrusts imparted to said shaft.

10. In a windshield mechanism, a rotatable worm shaft having spaced shoulders thereon, means for mounting said worm shaft permitting longitudinal movement thereof, end thrust resisting means including a member having an extension engageable with the worm shaft intermediate the shoulders aforesaid, and resilient means housed within said member and operable to normally urge the same in engagement with said worm shaft.

11. In a windshield mechanism, a casing a rotatable worm shaft having a reduced portion forming spaced shoulders, means for mounting said worm shaft within said casing permitting longitudinal movement of the shaft, and end thrust resisting means including a resiliently influenced member bifurcated at the lower end thereof to straddle the reduced portion of the shaft and engage the shoulders aforesaid.

12. In a windshield mechanism, a casing a worm shaft, means for mounting said shaft within said casing permitting longitudinal movement of the shaft, said worm shaft having a reduced portion presenting spaced shoulders having oppositely inclined beveled surfaces, a member slidably mounted within said casing having beveled surfaces engaging the beveled surfaces on said worm shaft, and resilient means disposed within said member and operable to normally urge the same into engagement with said worm shaft.

13. In a windshield operating mechanism, a rotatable worm shaft, means for mounting said worm shaft permitting longitudinal movement thereof, and an element tangentially engaging said shaft, the engaging surfaces of said shaft and element being shaped whereby said element resists longitudinal end thrusts imparted to said shaft.

14. In a windshield operating mechanism, a rotatable worm shaft having an enlargement, means for mounting said worm shaft permitting longitudinal movement thereof, a member tangentially engageable with the enlargement, the engaging surfaces of said member and enlargement being shaped whereby said member resists longitudinal end thrusts imparted to said shaft.

15. In a windshield operating mechanism, a casing, a gear sector adapted to be connected to the windshield, a worm meshing with said gear sector, a worm shaft, means for rockably supporting said worm shaft adjacent one end thereof, said means permitting longitudinal movement of said shaft, an element tangentially engaging said shaft, the engaging surfaces of said shaft and element being shaped whereby said element resists longitudinal end thrusts imparted to said shaft.

16. In a windshield construction, a worm shaft, means for mounting said shaft permitting rotation and permitting longitudinal movement thereof, said worm shaft being provided with spaced opposed surfaces, a slidably supported element provided with a portion engaging the opposed surfaces aforesaid, and means for forcing said element into engagement with said worm shaft.

In testimony whereof I affix my signature.

WILLIAM S. PRITCHARD.